United States Patent
Oyaizu

(10) Patent No.: US 11,400,601 B2
(45) Date of Patent: Aug. 2, 2022

(54) SPEECH AND BEHAVIOR CONTROL DEVICE, ROBOT, STORAGE MEDIUM STORING CONTROL PROGRAM, AND CONTROL METHOD FOR SPEECH AND BEHAVIOR CONTROL DEVICE

(71) Applicant: SHARP KABUSHIKI KAISHA, Sakai (JP)

(72) Inventor: Takuya Oyaizu, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 639 days.

(21) Appl. No.: 16/478,582

(22) PCT Filed: Dec. 27, 2017

(86) PCT No.: PCT/JP2017/046996
§ 371 (c)(1),
(2) Date: Jul. 17, 2019

(87) PCT Pub. No.: WO2018/135276
PCT Pub. Date: Jul. 26, 2018

(65) Prior Publication Data
US 2020/0039080 A1 Feb. 6, 2020

(30) Foreign Application Priority Data
Jan. 19, 2017 (JP) .............. JP2017-007779

(51) Int. Cl.
*B25J 13/00* (2006.01)
*B25J 11/00* (2006.01)
*G10L 25/63* (2013.01)

(52) U.S. Cl.
CPC .......... *B25J 13/003* (2013.01); *B25J 11/001* (2013.01); *G10L 25/63* (2013.01)

(58) Field of Classification Search
CPC ........ B25J 13/003; B25J 11/001; G10L 25/63
See application file for complete search history.

(56) References Cited

U.S. PATENT DOCUMENTS

| 7,065,490 B1 | 6/2006 | Asano et al. |
| 2002/0019678 A1 | 2/2002 | Mizokawa |
| 2005/0246063 A1* | 11/2005 | Oonaka .................. G10L 25/00 704/E11.001 |

FOREIGN PATENT DOCUMENTS

| CN | 105425970 A | 3/2016 |
| CN | 105929827 A | 9/2016 |
| JP | H08-318052 A | 12/1996 |
| JP | 2001-154681 A | 6/2001 |
| JP | 2002-049385 A | 2/2002 |
| JP | 2003-117866 A | 4/2003 |

(Continued)

*Primary Examiner* — Basil T. Jos
(74) *Attorney, Agent, or Firm* — ScienBiziP, P.C.

(57) ABSTRACT

The present invention allows a robot to carry out communication with excellent affectiveness. A speech and behavior control device (1) includes an utterance content selecting section (16) which selects utterance content of a robot (100) from among a plurality of utterances, a movement control section (17) which controls a movable part (13) to move based on a kind of feeling corresponding to the utterance content, and an audio control section (18) which controls the robot (100) to output the utterance content as audio after movement of the movable part (13) has been started.

6 Claims, 5 Drawing Sheets

(56) References Cited

FOREIGN PATENT DOCUMENTS

| | | |
|---|---|---|
| JP | 2007-118129 A | 5/2007 |
| JP | 2016-080894 A | 5/2016 |

* cited by examiner

FIG. 2

| META INFORMATION | UTTERANCE CONTENT |
|---|---|
| JOY-STRONG | HAPPY BIRTHDAY |
| JOY-WEAK | THE WEATHER IS FINE TODAY |
| APPRECIATION-STRONG | THANK YOU |
| LONELINESS-STRONG | GOODBYE |

FIG. 3

| META INFORMATION | MOTION |
|---|---|
| JOY-STRONG | RAISE BOTH HANDS HIGH |
| JOY-WEAK | RAISE BOTH HANDS |
| APPRECIATION-STRONG | BOW |
| LONELINESS-STRONG | RAISE BOTH HANDS HIGH AND WAVE HANDS |

SPEECH AND BEHAVIOR CONTROL DEVICE, ROBOT, STORAGE MEDIUM STORING CONTROL PROGRAM, AND CONTROL METHOD FOR SPEECH AND BEHAVIOR CONTROL DEVICE

TECHNICAL FIELD

The present invention relates to a speech and behavior control device, a robot, a control program, and a control method for the speech and behavior control device.

BACKGROUND ART

In recent years, research and development of electronic apparatuses capable of speaking to a user or the like have been actively carried out. For example, Patent Literature 1 discloses an electronic apparatus which utters an attention-seeking wording corresponding to a message when uttering the message. According to the electronic apparatus, the message is uttered after the attention of the user is directed to the electronic apparatus by the utterance of the attention-seeking wording, and this makes it possible to prevent the user from missing the message.

CITATION LIST

Patent Literature

Patent Literature 1: Japanese Patent Application Publication, Tokukai, No. 2016-080894 (Publication Date: May 16, 2016)

SUMMARY OF INVENTION

Technical Problem

However, according to the electronic apparatus disclosed in Patent Literature 1, movable parts of the electronic apparatus do not execute a particular motion when the electronic apparatus utters the message. From this, although the electronic apparatus can direct the attention of the user to the electronic apparatus when uttering the message, the electronic apparatus cannot cause the user to have a sense of anticipation that the electronic apparatus will utter some sort of message. Therefore, it is difficult for the electronic apparatus disclosed in Patent Literature 1 to carry out affective communication with the user.

An aspect of the present invention is accomplished in view of the above problem, and its object is to cause a robot to carry out affective communication.

Solution to Problem

In order to attain the object, a speech and behavior control device in accordance with an aspect of the present invention is a speech and behavior control device for controlling a movement of a movable part of a robot and controlling audio outputted by the robot, the speech and behavior control device including: an utterance content selecting section that selects utterance content of the robot from among a plurality of utterances which are associated with particular kinds of feelings; a movement control section that controls any one or more movable parts to move based on a kind of feeling which is associated with the utterance content which has been selected by the utterance content selecting section, the any one or more movable parts being included in the movable part; and an audio control section that controls the robot to output the utterance content as the audio after movement of the any one or more movable parts has been started by movement control by the movement control section.

In order to attain the object, a control method for a speech and behavior control device in accordance with an aspect of the present invention is a method for controlling a speech and behavior control device for controlling a movement of a movable part of a robot and controlling audio outputted by the robot, the method including: an utterance content selecting step of selecting utterance content of the robot from among a plurality of utterances which are associated with particular kinds of feelings; a movement control step of controlling any one or more movable parts to move based on a kind of feeling which is associated with the utterance content which has been selected in the utterance content selecting step, the any one or more movable parts being included in the movable part; and an audio control step of controlling the robot to output the utterance content as the audio after movement of the any one or more movable parts has been started by movement control in the movement control step.

Advantageous Effects of Invention

According to an aspect of the present invention, the robot is controlled to output audio after the movement of the movable part of the robot has been started, and this allows the robot to carry out communication with excellent affectiveness.

BRIEF DESCRIPTION OF DRAWINGS

FIG. 2 is a view illustrating an example of an utterance content table stored in a storage section of a robot in accordance with Embodiment 1 of the present invention.

FIG. 3 is a view illustrating an example of a motion table stored in the storage section of the robot in accordance with Embodiment 1 of the present invention.

DESCRIPTION OF EMBODIMENTS

Embodiment 1

The following description will discuss embodiments of the present invention in detail with reference to FIGS. 1 through 4. Embodiment 1 and subsequent embodiments will describe an example case in which a speech and behavior control device in accordance with an aspect of the present invention is built in a robot. Note, however, that the speech and behavior control device in accordance with an aspect of the present invention does not necessarily need to be built in the robot. For example, it is possible that the speech and behavior control device in accordance with an aspect of the present invention is provided in an external information processing device, and speech and behavior control by the speech and behavior control device is carried out based on transmission and reception of robot utterance content information and robot motion information between the information processing device and the robot.

<Functional Configuration of Robot>

Figure 1:
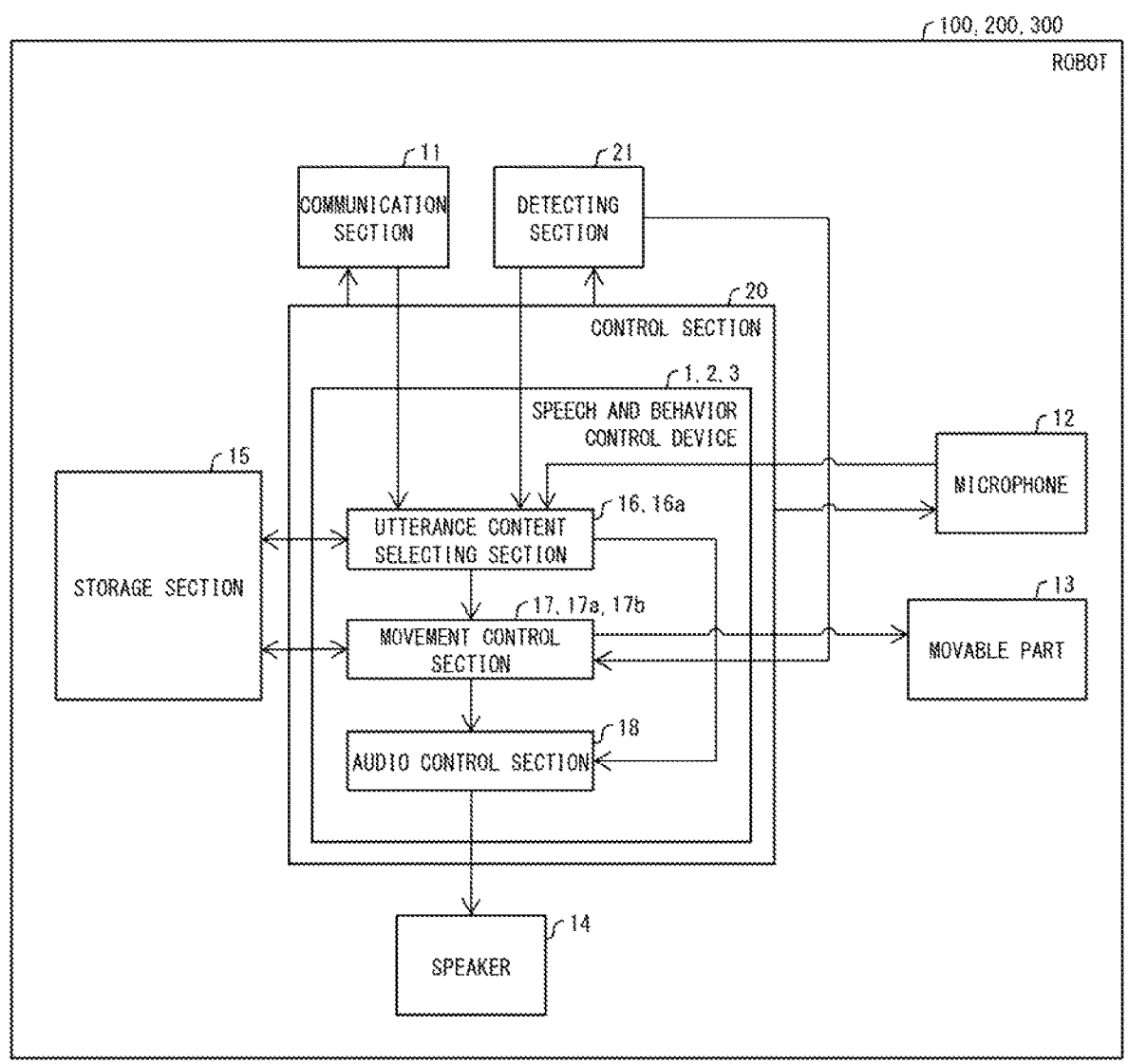
FIG. 1 is a block diagram illustrating a functional configuration of a robot in accordance with Embodiments 1, 2, and 3 of the present invention.

First, a functional configuration of a robot 100 in accordance with an embodiment of the present invention will be described with reference to FIGS. 1 through 3. FIG. 1 is a block diagram illustrating the functional configuration of the robot 100. FIG. 2 is a view illustrating an example of an utterance content table stored in a storage section 15 of the robot 100. FIG. 3 is a view illustrating an example of a motion table stored in the storage section 15.

The robot 100 is a communication robot capable of conversing with a user and a third person. As illustrated in FIG. 1, the robot 100 includes a plurality of movable parts 13 such as a head, arms, legs, and a waist. After starting movement of any one or more movable parts 13 for expressing a particular kind of feeling, the robot 100 outputs, as audio, utterance content corresponding to the feeling. The robot 100 includes a communication section 11, a microphone 12, a speaker 14, a storage section 15, and a control section 20.

The communication section 11 communicates (i.e., establishes a communication protocol) with an external information processing device (not illustrated) operated by the user. Specifically, the communication section 11 receives output instruction information transmitted from the external information processing device, and transmits the received output instruction information to the utterance content selecting section 16 (which will be described later). Here, the output instruction information is information on instructing the robot 100 to output audio representing particular utterance content.

The microphone 12 is a sound collector for detecting an utterance by a user or the like. The speaker 14 functions as an outputting section for outputting audio data transmitted from an audio control section 18 (which will be described later) to the outside as audio. The storage section 15 stores various kinds of data handled by the robot 100. The storage section 15 also stores the utterance content table shown in FIG. 2 and the motion table shown in FIG. 3 (both the tables will be described later in detail).

Note that the utterance content table and the motion table do not necessarily need to be stored in the storage section 15. For example, both the tables may be stored in an external storage device. Alternatively, for example, it is possible that the utterance content table is stored in a memory of the utterance content selecting section 16, and the motion table is stored in a memory of a movement control section 17 (which will be described later).

The control section 20 comprehensively controls the sections of the robot 100, and includes a speech and behavior control device 1. In FIG. 1, the control section 20 is built in the robot 100. Note, however, that the control section 20 may be an external device attached to the robot 100 or a network server used via the communication section 11.

The speech and behavior control device 1 is a device for controlling motions of the plurality of movable parts 13 provided in the robot 100 and controlling audio outputted from the robot 100 (specifically, from the speaker 14). The speech and behavior control device 1 controls speech and behavior of the robot 100 based on the output instruction information which has been transmitted from the external information processing device and received by the robot 100 via the communication section 11. The speech and behavior control device 1 includes the utterance content selecting section 16, the movement control section 17, and the audio control section 18 (see FIG. 1).

The utterance content selecting section 16 selects, from among the plurality of utterances associated with particular kinds of feelings, utterance content to be outputted as audio by the robot 100. Specifically, in Embodiment 1 and subsequent embodiments, the plurality of utterances are associated with three feelings of "joy", "appreciation", and "loneliness" (see FIG. 2 and FIG. 3). Upon receipt of the output instruction information transmitted from the communication section 11, the utterance content selecting section 16 invokes the utterance content table from the storage section 15, and searches the plurality of utterance content items stored in the utterance content table for utterance content included in the output instruction information. The utterance content selecting section 16 then selects the retrieved utterance content as the utterance content to be outputted by the robot 100 as audio. The utterance content selecting section 16 generates text data of the selected utterance content and transmits the text data to the audio control section 18.

Here, in Embodiment 1 and subsequent embodiments, four utterance content items are stored in the utterance content table as shown in FIG. 2. The four utterance content items are associated with different pieces of meta information, and these pieces of meta information are also stored in the utterance content table. The meta information includes a particular kind of feeling and intensity of the feeling and, for example, an utterance content item of "Happy Birthday" is associated with meta information including content of "Joy-Weak". The utterance content selecting section 16 transmits, to the movement control section 17, the meta information associated with the retrieved utterance content.

The number and kinds of utterance content items stored in the utterance content table are not limited to the example shown in FIG. 2, and can be arbitrarily set. Moreover, the kinds of feelings included in the meta information are not limited to the example shown in FIG. 2, and can be arbitrarily set. Furthermore, the meta information does not necessarily need to include the intensity of feeling. In other words, the utterance content items stored in the utterance content table only need to be associated with the particular kinds of feelings.

In addition, unlike Embodiment 1 and subsequent embodiments, it is not necessary that the utterance content selection unit 16 selects utterance content by receiving the output instruction information. For example, it is possible to employ a configuration in which the microphone 12 detects an utterance of the user and transmits audio data of the utterance to the utterance content selecting section 16, and thus selection of utterance content is carried out. That is, it is possible to employ a configuration in which the utterance content selecting section 16 generates text data indicative of the utterance content from the received audio data, and searches the utterance content table for utterance content that is a response to the utterance of the user (i.e., the utterance content indicated by text data). Specifically, in a case where the user has uttered "Goodbye", the utterance content selecting section 16 may select "Goodbye" from the utterance content table.

The movement control section 17 controls any one or more movable parts 13 to move based on a kind of feeling associated with the utterance content selected by the utterance content selecting section 16. Specifically, in a case where the movement control section 17 has received the meta information transmitted from the utterance content selecting section 16, the movement control section 17 invokes the motion table from the storage section 15.

Next, the movement control section 17 searches the plurality of motions stored in the motion table for a motion that is associated with the particular kind of feeling and with the intensity of the feeling contained in the meta information. The movement control section 17 then controls a particular movable part(s) 13 used to execute the retrieved motion to move so that the robot 100 executes the retrieved motion. After the robot 100 has executed the retrieved motion, the movement control section 17 transmits execution finish information to the audio control section 18.

Here, in Embodiment 1 and subsequent embodiments, four motions are stored in the motion table as shown in FIG. 3. The four motions are associated with respective pieces of meta information having the same content as the four pieces of meta information stored in the utterance content table, and these pieces of meta information are also stored in the motion table. Note that the number and kinds of motions stored in the motion table are not limited to the example shown in FIG. 3, and can be arbitrarily set.

For example, in a case where the movement control section 17 has received meta information containing content of "Appreciation-Strong", the movement control section 17 controls a particular movable part(s) 13 used for the robot 100 to execute a motion of "Bow" to move. Specifically, the movement control section 17 controls the waist (movable part 13) to rotate so that an upper body of the robot 100 tilts forward.

After the movement of the one or more movable parts by the movement control by the movement control section 17 has finished, the audio control section 18 controls the robot 100 (specifically, the speaker 14) to output, as audio, the retrieved utterance content received from the utterance content selecting section 16. Specifically, in a case where the audio control section 18 has received the text data transmitted from the utterance content selecting section 16 and the execution finish information transmitted from the movement control section 17, the audio control section 18 converts the text data into audio data, and transmits the converted audio data to the speaker 14. In a case where the audio control section 18 has thus transmitted the audio data to the speaker 14, the robot 100 outputs the utterance content selected by the utterance content selecting section 16 as audio via the speaker 14.

Note that, in Embodiment 1 and subsequent embodiments, receipt of execution finish information from the movement control section 17 is a condition for starting the audio control by the audio control section 18. In other words, the audio control section 18 starts audio control after the robot 100 has finished execution of motion. However, a point in time at which the audio control section 18 starts the audio control is not limited to the above described case. For example, the robot 100 may output audio (i.e., the audio control section 18 may carry out audio control) in the middle of execution of motion. In other words, the audio control section 18 only needs to control the robot 100 to output audio after the movement of the one or more movable parts 13 has been started by the movement control by the movement control section 17.

However, in order to provide the user or the like with the sense of anticipation that the robot 100 will give some sort of utterance expressing a particular feeling, it is preferable that the user views the process of executed motion for a longer period of time prior to the utterance of the robot 100. From this point of view, the effect is mostly achieved by the configuration in which the audio control section 18 starts audio control after the execution of motion of the robot 100 is finished, as in Embodiment 1 and subsequent embodiments.

<Characteristic Operation of Robot>

Figure 4:
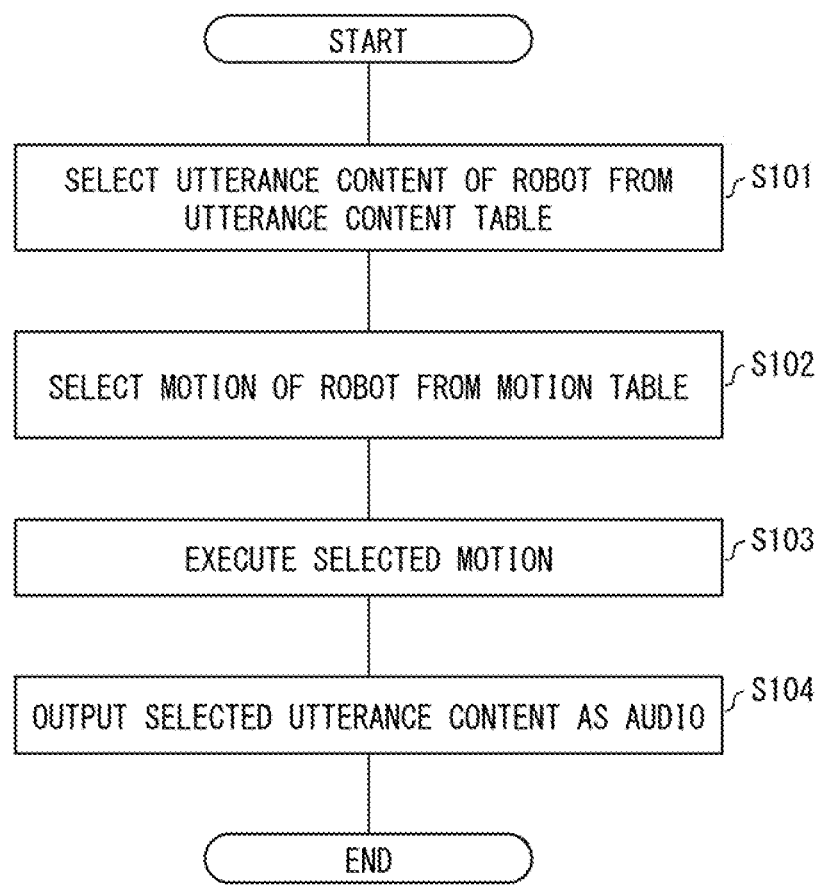
FIG. 4 is a flowchart showing an example of a characteristic operation flow of the robot in accordance with Embodiment 1 of the present invention.

Next, characteristic operations of the robot 100 will be described with reference to the flowchart shown in FIG. 4. FIG. 4 is a flowchart showing an example of a characteristic operation flow of the robot 100. Note that the flowchart shown in FIG. 4 indicates operations of the robot 100 after the utterance content selecting section 16 has received output instruction information from the external information processing device. The same applies to the flowcharts shown in FIGS. 5 and 6.

First, the utterance content selecting section 16 receives output instruction information from the external information processing device via the communication section 11, and then the operations of the flowchart shown in FIG. 4 start (START). In step S101 (utterance content selecting step: hereinafter "step" will be omitted), the utterance content selecting section 16 searches the utterance content table invoked from the storage section 15 and selects utterance content of the robot 100, and then the process proceeds to S102. Text data indicative of the selected utterance content is transmitted to the audio control section 18, and meta information associated with the selected utterance content is transmitted to the movement control section 17.

Next, in S102 (motion selecting step), the movement control section 17 that has received the meta information searches the motion table invoked from the storage section 15 and selects a motion to be executed by the robot 100, and then the process proceeds to S103. In S103 (motion executing step (movement control step)), the movement control section 17 controls the robot 100 to execute the motion, and then the process proceeds to S104. In other words, the movement control section 17 controls any one or more movable parts 13 which are used to execute the motion to move. After the execution of motion is finished, execution finish information is transmitted to the audio control section 18.

Next, in S104 (audio control step), the audio control section 18 which has received the text data and the execution finish information converts the text data into audio data and transmits the audio data to the speaker 14, and controls the speaker 14 to output the selected utterance content as audio (END).

Embodiment 2

Figure 5:
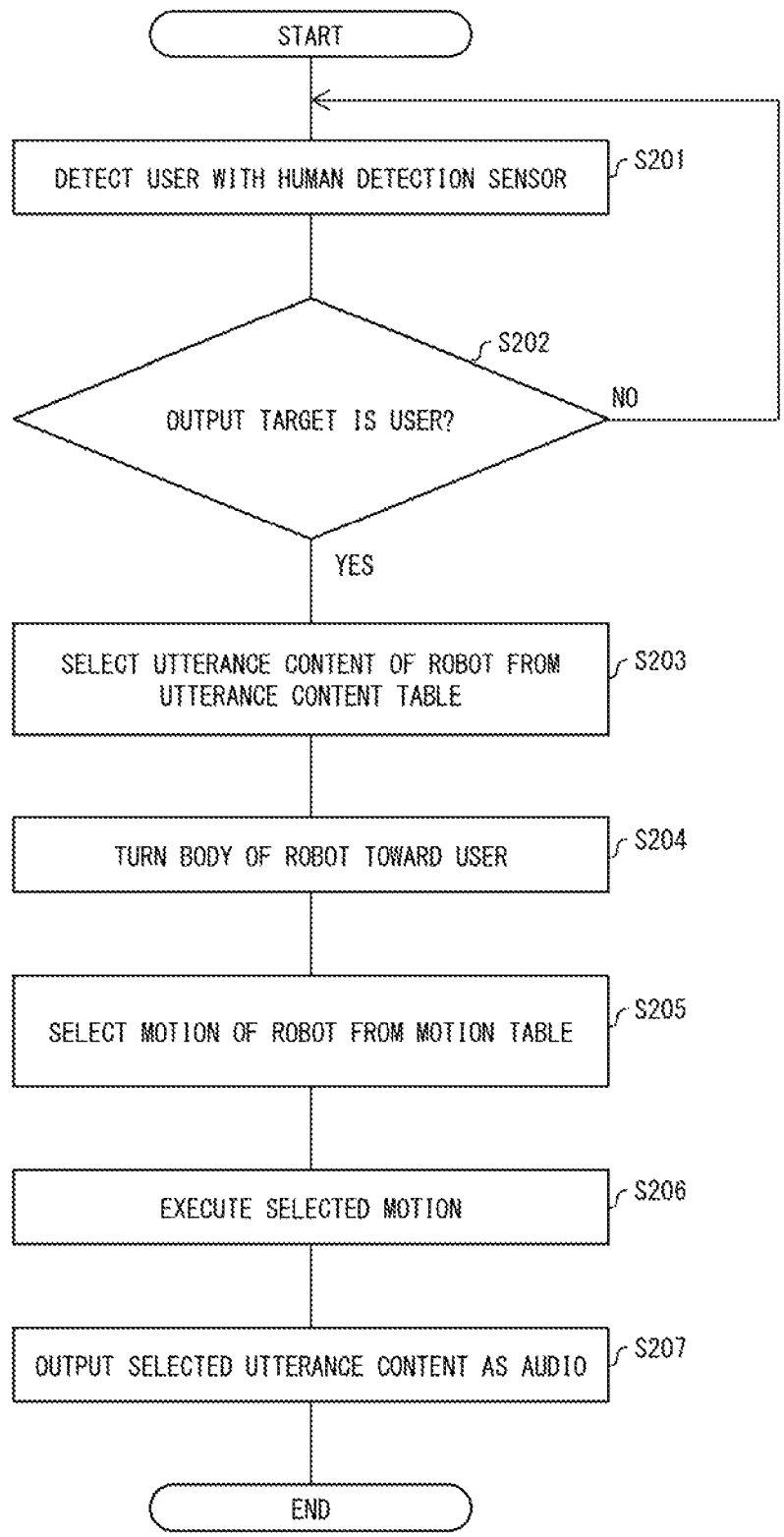
FIG. 5 is a flowchart showing an example of a characteristic operation flow of a robot in accordance with Embodiment 2 of the present invention.

The following description will discuss another embodiment of the present invention with reference to FIGS. 1 and 5. For convenience of explanation, identical reference numerals are given to constituent members having functions identical with those of the constituent members described in the foregoing embodiment, and descriptions of such constituent members are omitted here. A robot 200 in accordance with Embodiment 2 differs from the robot 100 in accordance with Embodiment 1 in that the robot 200 includes a detecting section 21. A speech and behavior control device 2 in accordance with Embodiment 2 differs from the speech and behavior control device 1 in accordance with Embodiment 1 in that the speech and behavior control device 2 includes an utterance content selecting section 16a instead of the utterance content selecting section 16 and includes a movement control section 17a instead of the movement control section 17.

<Functional Configuration of Robot>

First, a functional configuration of the robot 200 will be described with reference to FIG. 1. FIG. 1 is a block diagram illustrating the functional configuration of the robot 200. The robot 200 is a communication robot capable of conversing with a user and a third person, as with the robot 100. A robot 300 described later is also similar to the robots 100 and 200. The speech and behavior control device 2 is a device for controlling motions of the plurality of movable parts 13 provided in the robot 200 and controlling audio outputted from the robot 200, as with the speech and behavior control device 1. A speech and behavior control device 3 described later is also similar to the speech and behavior control devices 1 and 2.

The detecting section 21 detects an output target, i.e., a user or a third person toward which the robot 200 outputs audio. The detecting section 21 that has detected the user or the third person transmits a detection result to the utterance content selecting section 16a. In Embodiment 2 and Embodiment 3, a human detection sensor is used as the detecting section 21. Note that the detecting section 21 can be realized by, for example, a camera or a microvibration detector, instead of the human detection sensor.

In a case where the utterance content selecting section 16a has received the detection result from the detecting section 21, that is, in a case where the output target has been detected by the detecting section 21, the utterance content selecting section 16a determines whether the output target is the user or the third person. In a case where the utterance content selecting section 16a has determined that the output target is the user, the utterance content selecting section 16a searches the utterance content table to select utterance content of the robot 200. Processes after the selection are the same as those carried out by the utterance content selecting section 16. In contrast, in a case where the utterance content selecting section 16a has determined that the output target is the third person, the utterance content selecting section 16a does not select utterance content. In this case, detection of the output target is carried out again by the detecting section 21.

In a case where the movement control section 17a has received meta information from the utterance content selecting section 16a, the movement control section 17a controls any one or more movable parts 13 to move so that the robot 200 turns and faces toward a location at which the user exists, prior to controlling the robot 200 to execute the motion. Here, any movable part(s) 13 may be controlled to move, as long as the robot 200 turns and faces toward a location at which the user exists. However, in order to enhance the sense of anticipation of the user, it is preferable to control as many movable parts 13 as possible to move so as to widen movement of the robot 200 in turning and facing toward the location at which the user exists. Processes after the robot 200 has turned and faced toward the location at which the user exists are the same as those carried out by the movement control section 17.

<Characteristic Operation of Robot>

Next, characteristic operations of the robot 200 will be described with reference to the flowchart shown in FIG. 5. FIG. 5 is a flowchart showing an example of a characteristic operation flow of the robot 200. First, in S201 (output target detecting step), the detecting section detects an output target and transmits a detection result to the utterance content selecting section 16a, and the process proceeds to S202.

Next, in S202 (user presence judging step), the utterance content selecting section 16a which has received the detection result determines whether or not the output target detected by the detecting section 21 is the user. In a case where the utterance content selecting section 16a has made a determination of YES (hereinafter abbreviated as "Y") in S202, the utterance content selecting section 16a selects utterance content of the robot 200 in a manner similar to that of the utterance content selecting section (S203: utterance content selecting step), and the process proceeds to S204. In contrast, in a case where the utterance content selecting section 16a has made a determination of NO (hereinafter abbreviated as "N") in S202, detection of the output target is carried out again by the detecting section 21 (S201).

Next, in S204 (direction adjusting step), the movement control section 17a which has received meta information controls a particular movable part(s) 13 to move so that the robot 200 turns and faces toward a location at which the user exists. Processes after the robot 200 has turned and faced toward the location at which the user exists (i.e., processes in S205 through S207) are the same as the processes in S102 through S104 in the flowchart shown in FIG. 4. Therefore, those processes are not described here.

Embodiment 3

The following description will discuss another embodiment of the present invention with reference to FIGS. and 6. For convenience of explanation, identical reference numerals are given to constituent members having functions identical with those of the constituent members described in the foregoing embodiments, and descriptions of such constituent members are omitted here.

A robot 300 in accordance with Embodiment 3 differs from the robot 100 in accordance with Embodiment 1 in that the robot 300 includes a detecting section 21. A speech and behavior control device 3 in accordance with Embodiment 3 differs from the speech and behavior control device 1 in accordance with Embodiment 1 in that the speech and behavior control device 3 includes an utterance content selecting section 16a instead of the utterance content selecting section 16. Further, the speech and behavior control device 3 in accordance with Embodiment 3 differs from the speech and behavior control devices 1 and 2 in accordance with respective Embodiments 1 and 2 in that the speech and behavior control device 3 includes a movement control section 17b instead of the movement control section 17.

<Functional Configuration of Robot>

First, a functional configuration of the robot 300 will be described with reference to FIG. 1. FIG. 1 is a block diagram illustrating the functional configuration of the robot 300. The detecting section 21 in accordance with Embodiment 3 transmits a detection result not only to the utterance content selecting section 16a but also to the movement control section 17b. The utterance content selecting section 16a in accordance with Embodiment 3 searches the utterance content table to select utterance content and transmits meta information to the movement control section 17b even in a case where the utterance content selecting section 16a has determined that the output target detected by the detecting section 21 is a third person.

In a case where the movement control section 17b has received the detection result from the detecting section 21 and received the meta information from the utterance content selecting section 16a, the movement control section 17b first determines whether or not the output target detected by the detecting section 21 is the user. Then, the movement control section 17b controls any one or more movable parts 13 to move so that the robot 300 turns and faces toward a location at which the output target exists, prior to causing the robot 300 to execute the motion. That is, the movement control section 17*b* controls the particular movable part(s) 13 to move so that, (i) if the output target is the user, the robot 300 turns and faces toward the location at which the user exists or, (ii) if the output target is the third person (i.e., not the user), the robot 300 turns and faces toward the location at which the third person exists.

Then, after the robot 300 has tuned and faced toward the location at which the output target exists, the movement control section 17*b* causes the robot 300 to execute the motion. Specifically, the movement control section 17*b* controls any one or more movable parts 13 to move (first movement) so that, if the output target detected by the detecting section 21 is the user, the robot 300 executes a first motion that the user prefers. For example, in a case where the user has a preference to have the robot 300 execute an expressive motion, movable parts 13 are controlled to move so that the moving range of the movable parts 13 becomes wider. Specifically, in a case where a feeling or the like in meta information is "Joy-Strong", the arm or arms of the robot 300 are controlled to move (first motion) so that the arm or arms rise to approximately 90° with respect to the horizontal direction.

In contrast, in a case where the output target is the third person, the movement control section 17*b* controls any one or more movable parts 13 to move (second movement) so that the robot 300 executes a second motion that is different from the first motion. In the above example, even in a case where a feeling or the like in meta information is "Joy-Strong", the arm of the robot 300 is controlled to move (second motion) so that the arm rises only up to approximately 45° with respect to the horizontal direction.

As described above, even in a case where the movement control section 17*b* has selected the same motion from the motion table, the sense of anticipation of the user can be further enhanced by making an aspect of actually executed motion different between the case where the output target is the user and the case where the output target is the third person.

<Characteristic Operation of Robot>

Figure 6:
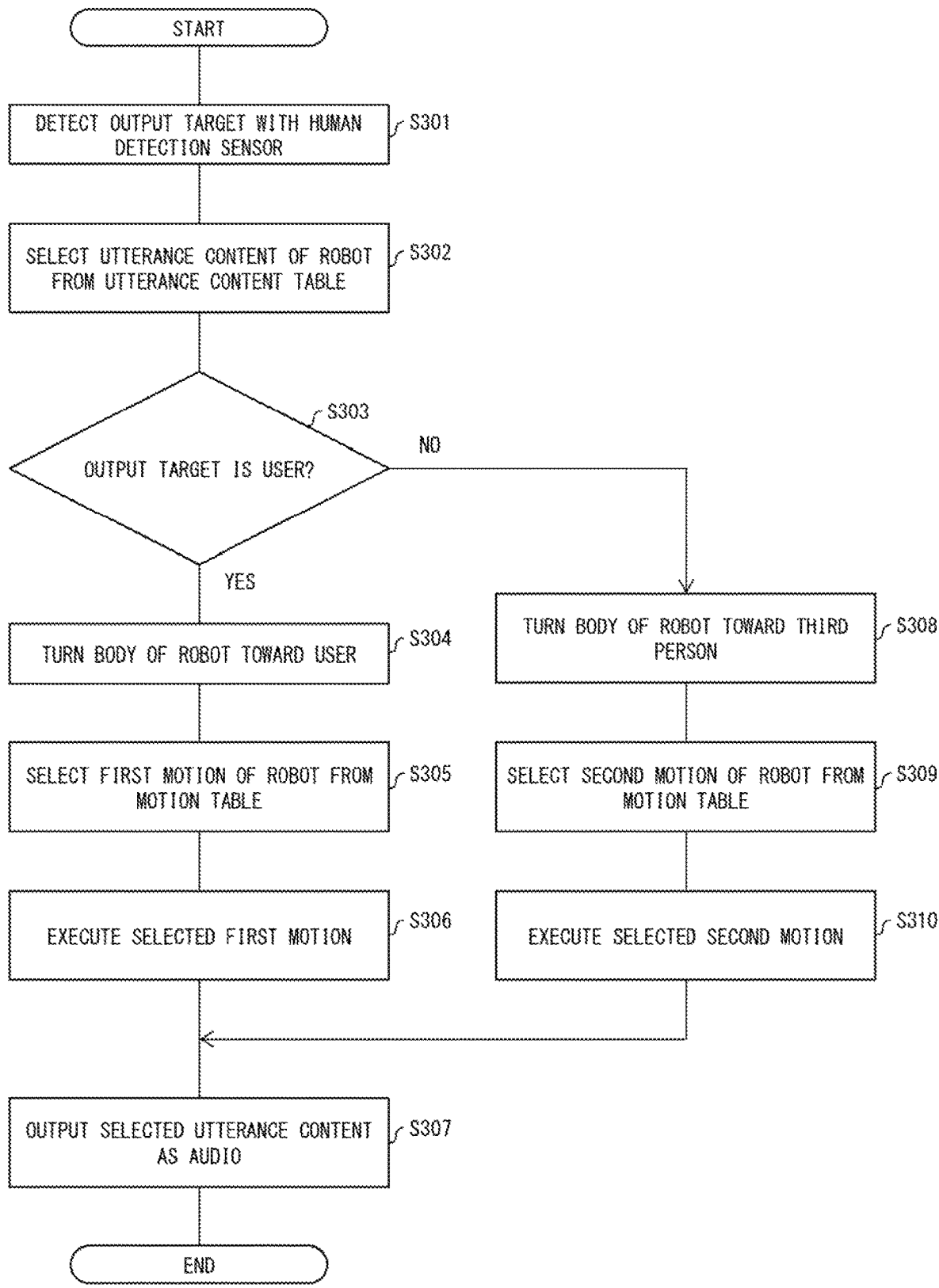
FIG. 6 is a flowchart showing an example of a characteristic operation flow of a robot in accordance with Embodiment 3 of the present invention.

Next, characteristic operations of the robot 300 will be described with reference to the flowchart shown in FIG. 6. FIG. 6 is a flowchart showing an example of a characteristic operation flow of the robot 300. First, in S301 (output target detecting step), the detecting section detects an output target and transmits a detection result to the utterance content selecting section 16*a* and to the movement control section 17*b*, and the process proceeds to S302.

Next, in S302 (utterance content selecting step), the utterance content selecting section 16*a* which has received the detection result searches the utterance content table and selects utterance content of the robot 300, and then the process proceeds to S303. Text data indicative of the selected utterance content is transmitted to the audio control section 18, and meta information associated with the selected utterance content is transmitted to the movement control section 17*b*.

Next, in S303 (user presence judging step), the movement control section 17*b* which has received the detection result and the meta information determines whether or not the output target detected by the detecting section 21 is the user. In a case where the movement control section 17*b* has made a determination of Y in S303, the movement control section 17*b* controls a particular movable part(s) 13 to move so that the robot 300 turns and faces toward a location at which the user exists (S304: first direction adjusting step). In contrast, in a case where the movement control section 17*b* has made a determination of N in S303, the movement control section 17*b* controls a particular movable part(s) 13 to move so that the robot 300 turns and faces toward a location at which the third person exists (S308: second direction adjusting step).

Next, in S305 (first motion selecting step), the movement control section 17*b* selects the first motion to be executed by the robot 300, and the process proceeds to S306. In S306 (first motion executing step (movement control step)), the movement control section 17*b* causes the robot 300 to execute the first motion, and the process proceeds to S307.

In contrast, in S309 (second motion selecting step), the movement control section 17*b* selects the second motion to be executed by the robot 300, and the process proceeds to S310. In S310 (second motion executing step (movement control step)), the movement control section 17*b* causes the robot 300 to execute the second motion, and the process proceeds to S307. The process in S307 is the same as the processes in S104 in the flowchart shown in FIG. 4 and in S207 in the flowchart shown in FIG. 5. Therefore, the process is not described here.

[Example of Configuration Achieved by Software]

The control blocks (in particular, the utterance content selecting section 16, the movement control section 17, and the audio control section 18) of the speech and behavior control devices 1, 2, and 3 can be realized by a logic circuit (hardware) provided in an integrated circuit (IC chip) or the like or can be alternatively realized by software with use of a central processing unit (CPU).

In the latter case, each of the speech and behavior control devices 1, 2, and 3 includes a CPU that executes instructions of a program that is software realizing the foregoing functions; a read only memory (ROM) or a storage device (each referred to as "recording medium") in which the program and various kinds of data are stored so as to be readable by a computer (or a CPU); a random access memory (RAM) in which the program is loaded; and the like. In a case where the computer (or CPU) reads out the program from the recording medium and executes the program, the object of the present invention is achieved. The recording medium can be a "non-transitory tangible medium" such as, for example, a tape, a disk, a card, a semiconductor memory, a programmable logic circuit, or the like. The program can be made available to the computer via any transmission medium (such as a communication network or a broadcast wave) that can transmit the program. Note that an aspect of the present invention can also be achieved in the form of a computer data signal in which the program is embodied via electronic transmission and which is embedded in a carrier wave.

[Recap]

The speech and behavior control device (1, 2, 3) in accordance with an aspect 1 of the present invention is a speech and behavior control device for controlling a movement of a movable part (13) of a robot (100, 200, 300) and controlling audio outputted by the robot, the speech and behavior control device including: an utterance content selecting section (16, 16*a*) that selects utterance content of the robot from among a plurality of utterances which are associated with particular kinds of feelings; a movement control section (17, 17*a*, 17*b*) that controls one or more movable parts to move based on a kind of feeling which is associated with the utterance content which has been selected by the utterance content selecting section, the any one or more movable parts being included in the movable part; and an audio control section (18) that controls the robot to output the utterance content as the audio after movement of the any one or more movable parts has been started by movement control by the movement control section.

According to the configuration, after starting movement of any one or more movable parts for expressing a particular kind of feeling, the robot outputs, as audio, utterance content selected by the utterance content selecting section. From this, the user can predict that the robot will give an utterance corresponding to the movement of the movable parts by, before the robot outputs the audio, viewing the robot after the movement has been started.

Therefore, the user has the sense of anticipation that the robot will give some sort of utterance expressing a particular feeling. As such, the speech and behavior control device in accordance with an aspect of the present invention can cause the robot to carry out communication with excellent affectiveness.

According to the speech and behavior control device (1, 2, 3) in accordance with an aspect 2 of the present invention, it is possible in the aspect 1 that: each of the plurality of utterances is further associated with intensity of feeling; and the movement control section controls the any one or more movable parts to move based on the kind of feeling and the intensity of feeling which are associated with the utterance content.

According to the configuration, a plurality of variations can be provided for each of the utterances and movements of the movable parts associated with the particular kinds of feelings based on the intensity of feeling. From this, the speech and behavior of the robot become more expressive, and this allows the user who has viewed the robot after the movement of the movable parts has been started to have a stronger sense of anticipation that the robot will give some sort of utterance expressing a particular feeling. Therefore, the speech and behavior control device in accordance with an aspect of the present invention can cause the robot to carry out communication with more excellent affectiveness.

The speech and behavior control device (2, 3) in accordance with an aspect 3 of the present invention can further include, in the aspect 1 or 2: a detecting section (21) that detects an output target toward which the robot (200, 300) outputs the audio, in a case where the output target has been detected by the detecting section, the utterance content selecting section (16a) selecting the utterance content from among the plurality of utterances, before controlling the any one or more movable parts to move based on the kind of feeling which is associated with the utterance content which has been selected by the utterance content selecting section, the movement control section (17a, 17b) controlling the any one or more movable parts to move so that the robot turns and faces toward a location at which the output target exists.

According to the configuration, in a case where an output target has been detected by the detecting section, the robot starts the movement of the movable parts associated with the particular kind of feeling after turning and facing toward the location at which the output target exists, and outputs the utterance content as the audio. Thus, the output target can predict subsequent speech and behavior of the robot based on the movement of the robot, i.e., turning and facing toward the location at which the output target exists.

Therefore, the output target will have, from a point in time at which the robot has tuned and faced toward the location at which the output target exists, the sense of anticipation that the robot will give some sort of utterance expressing a particular feeling. From this, the speech and behavior control device in accordance with an aspect of the present invention can cause the robot to carry out communication with excellent affectiveness for a longer time.

According to the speech and behavior control device (3) in accordance with an aspect 4 of the present invention, it is possible in the aspect 3 that: the movement of the movable part includes a first movement and a second movement, the first movement being carried out by the any one or more movable parts in a case where the output target is a user, and the second movement being carried out by the any one or more movable parts in a case where the output target is not the user; in a case where the output target is the user, the movement control section (17b) carries out the movement control so that the movable part carries out the first movement; and in a case where the output target is not the user, the movement control section carries out the movement control so that the movable part carries out the second movement.

According to the configuration, the movement control section can switch movement of the movable part to either the first movement or the second movement depending on whether or not the output target is the user. Therefore, for example, in a case where the first movement is set to have an expression aspect which is preferred by the user and is distinguished from an expression aspect of the second movement, the user who has viewed the robot after the first movement is started is to clearly have a sense of anticipation that the robot will give the user some sort of utterance expressing a particular feeling. Therefore, the speech and behavior control device in accordance with an aspect of the present invention can cause the robot to carry out communication with more excellent affectiveness.

The robot (100, 200, 300) in accordance with an aspect 5 of the present invention includes the speech and behavior control device (1, 2, 3) in accordance with any one of the aspects 1 through 4. According to the configuration, it is possible to provide the robot capable of carrying out communication with excellent affectiveness.

The control method for a speech and behavior control device in accordance with an aspect 6 of the present invention is a method for controlling a speech and behavior control device for controlling a movement of a movable part of a robot and controlling audio outputted by the robot, the method including: an utterance content selecting step (S101, S203, S302) of selecting utterance content of the robot from among a plurality of utterances which are associated with particular kinds of feelings; a movement control step (S103, S206, S306, S310) of controlling any one or more movable parts to move based on a kind of feeling which is associated with the utterance content which has been selected in the utterance content selecting step, the any one or more movable parts being included in the movable part; and an audio control step (S104, S207, S307) of controlling the robot to output the utterance content as the audio after movement of the any one or more movable parts has been started by movement control in the movement control step.

According to the configuration, it is possible to provide the control method for the speech and behavior control device that can cause the robot to carry out communication with excellent affectiveness.

The speech and behavior control device in accordance with each of the aspects of the present invention can be realized by a computer. In such a case, the present invention encompasses (i) a control program of the speech and behavior control device which control program causes the computer to serve as the sections (software elements) included in the speech and behavior control device for realizing the speech and behavior control device and (ii) a computer-readable storage medium storing the control program.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 1, 2, 3: Speech and behavior control device
13: Movable part
16, 16a: Utterance content selecting section
17, 17a, 17b: Movement control section
18: Audio control section
21: Detecting section
100, 200, 300: Robot

The invention claimed is:

1. A speech and behavior control device for controlling a movement of a movable part of a robot and controlling audio outputted by the robot, said speech and behavior control device comprising:
a detecting section that detects an output target toward which the robot outputs the audio;
an utterance content selecting section that selects utterance content of the robot from among a plurality of utterances which are associated with particular kinds of feelings;
a movement control section that controls any one or more movable parts to move based on a kind of feeling which is associated with the utterance content which has been selected by the utterance content selecting section, the any one or more movable parts being included in said movable part; and
an audio control section that controls the robot to output the utterance content as the audio after movement of the any one or more movable parts has been started by movement control by the movement control section,
in a case where the output target which has been detected by the detecting section is a user, the utterance content selecting section selecting the utterance content from among the plurality of utterances and, in a case where the output target which has been detected by the detecting section is not the user, the utterance content selecting section refraining from selecting the utterance content.

2. The speech and behavior control device as set forth in claim 1, wherein:
each of the plurality of utterances is further associated with intensity of feeling; and
the movement control section controls the any one or more movable parts to move based on the kind of feeling and the intensity of feeling which are associated with the utterance content.

3. The speech and behavior control device as set forth in claim 1 or 2, wherein:
before controlling the any one or more movable parts to move based on the kind of feeling which is associated with the utterance content which has been selected by the utterance content selecting section, the movement control section controls the any one or more movable parts to move so that the robot turns and faces toward a location at which the user exists.

4. A robot comprising a speech and behavior control device recited in claim 1.

5. A non-transitory computer readable storage medium that stores a control program for causing a computer to function as a speech and behavior control device recited in claim 1, said control program causing the computer to function as the utterance content selecting section, the movement control section, and the audio control section.

6. A method for controlling a speech and behavior control device for controlling a movement of a movable part of a robot and controlling audio outputted by the robot, said method comprising:
a detecting step of detecting an output target toward which the robot outputs the audio;
an utterance content selecting step of selecting utterance content of the robot from among a plurality of utterances which are associated with particular kinds of feelings;
a movement control step of controlling any one or more movable parts to move based on a kind of feeling which is associated with the utterance content which has been selected in the utterance content selecting step, the any one or more movable parts being included in said movable part; and
an audio control step of controlling the robot to output the utterance content as the audio after movement of the any one or more movable parts has been started by movement control in the movement control step,
in a case where the output target which has been detected in the detecting step is a user, the utterance content being selected from among the plurality of utterances in the utterance content selecting step and, in a case where the output target which has been detected in the detecting step is not the user, selection of the utterance content being not carried out in the utterance content selecting step.

* * * * *